2 Sheets—Sheet 1.
J. FOWLER, Jr., & D. GREIG.
Steam-Plow.
No. {1,023, 32,027.}
Patented Apr. 9, 1861.
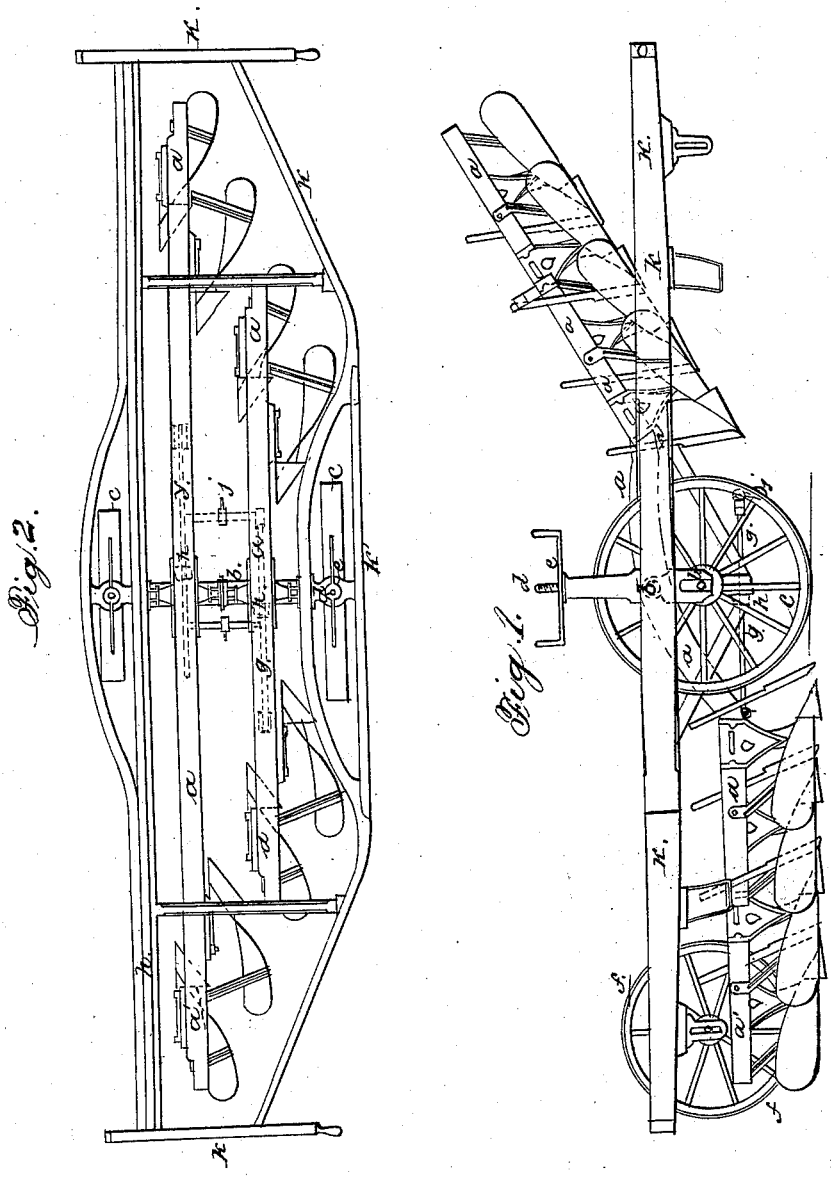

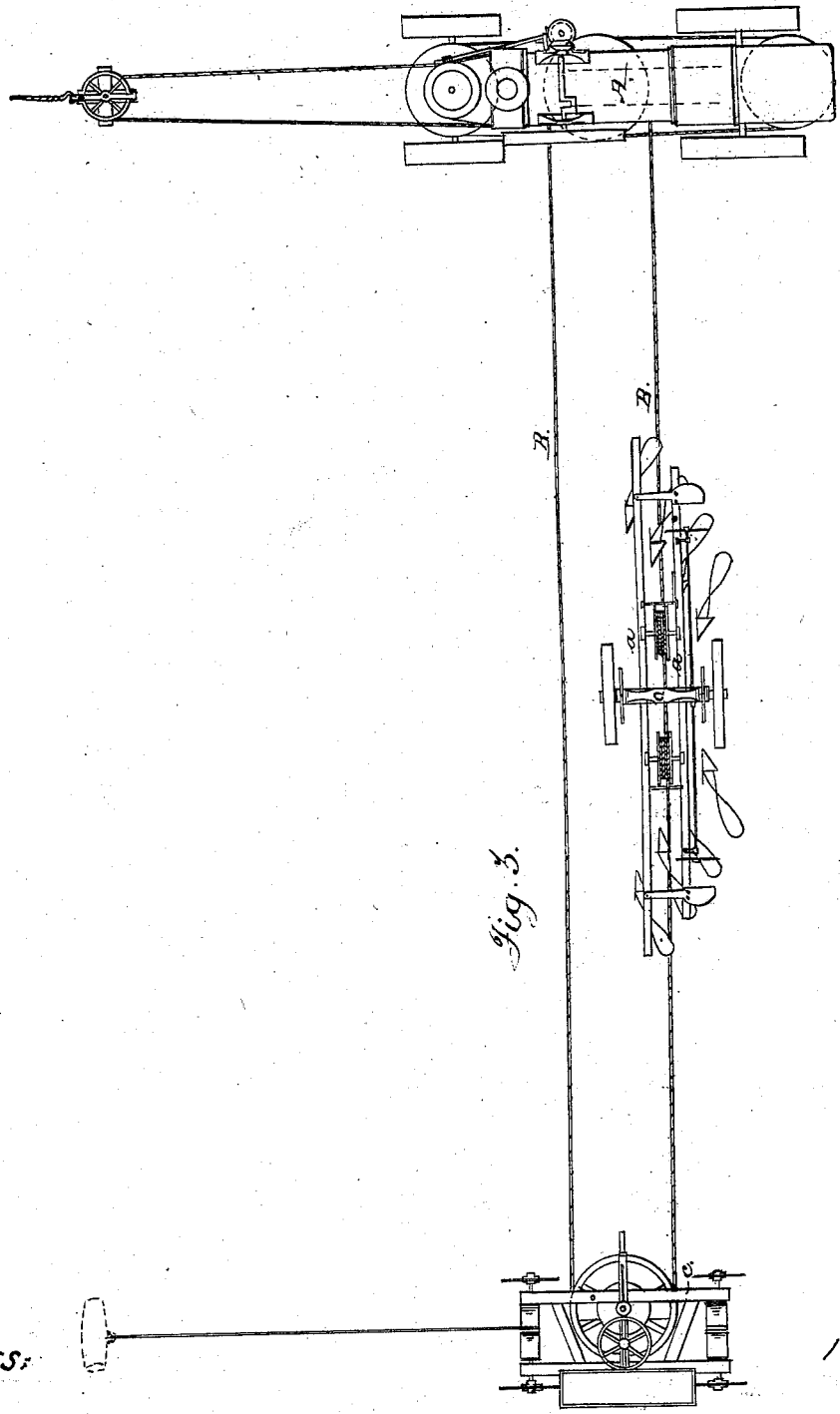

UNITED STATES PATENT OFFICE.

JOHN FOWLER, JR., OF HAVERING, AND D. GREIG, OF BARKINGSIDE, ENGLAND, ASSIGNORS TO WM. PENN TATHAM.

IMPROVEMENT IN MACHINERY FOR PLOWING AND TILLING LAND.

Specification forming part of Letters Patent No. 32,027, dated April 9, 1861.

*To all whom it may concern:*

Be it known that we, JOHN FOWLER, Jr., of Havering, in the county of Essex, England, and DAVID GREIG, of Barkingside, in the county of Essex, England, have invented certain new and useful Improvements in Machinery for Plowing and Tilling Land; and we do hereby declare that the following is a full, clear, and exact description thereof, reference being had to the accompanying drawings, making part of this specification, in which—

Figure 1 is a side elevation, and Fig. 2 a plan, and Fig. 3 a plan of the entire apparatus in the field.

The same letters indicate like parts in all the figures.

Our said invention relates to improvements in the well-known method of plowing and tilling land, in which the plows or other tilling instruments are drawn back and forth across a field by steam-power, the engine being caused to shift its position along one edge of the field, and the ropes or equivalents for drawing the plows, &c., pass around suitable pulleys in what is termed an "anchoring apparatus" at the opposite side of the field, and which is also caused to shift its position; and the object of our said invention is to avoid the necessity of turning the plows or other tilling instruments at the end of each course across the field; and our said invention consists in mounting two gangs of plows or other tilling instruments in suitable frame-work and connecting them with a pair of sustaining and gaging wheels interposed between the two gangs of instruments, when this is combined with the pulling ropes or chains and suitable means of attachment thereto, so that by the operation of an engine on one side of a field and a suitable anchoring apparatus at the other side the said plows or other tilling instruments can be drawn across the field alternately in opposite directions, and so that at the end of each course one set of implements shall be or may be lifted out of action and the other set brought into action for the reverse course without the labor or inconvenience of turning the implements and disconnecting them from and reconnecting them with the pulling ropes or chains.

In the accompanying drawings, A represents a locomotive steam-engine mounted on suitable wheels, so that it can be shifted or moved in position at intervals or otherwise along one edge of the field to be tilled, and provided with suitable means for giving motion to the wire ropes B B', or equivalents therefor, alternately in opposite directions; and C is the anchoring apparatus to be stationed at the opposite edge of the field, and provided with a pulley or other suitable means, around which the rope B passes, and also provided with suitable means for shifting its position in unison with the steam-engine A.

Two gangs of plows or other tilling instruments (plows being represented in the drawings) are arranged as represented in the accompanying drawings, or in any other suitable manner, in a frame, *a*, mounted so as to vibrate in a vertical, or nearly vertical, plane on a horizontal axle, *b*, in another frame, *k*, mounted and sustained on a pair of wheels, *c c*, placed centrally between the two gangs of plows or other tilling instruments. The axle of this pair of wheels has its journals fitted to turn in boxes *l*, which slide in pedestals in the frame *k*; and these boxes are each provided with an adjusting screw-rod, *d*, which passes up above the frame *k*, and there provided with a nut, *e*, by the turning of which the attendant can readily and with great accuracy elevate and depress the frames *k* and *a*, so as to adjust the depth to which the tilling instruments are required to enter below the surface of the ground, the said wheels *c c* thereby serving the double purpose of sustaining the tilling instrument and of gaging the depth of cut.

The two wheels *c c*, it will be seen, are represented as of different diameter, because the implements represented are plows, and one of the wheels (the smallest) is intended to run on the unplowed surface and the other at the bottom of a furrow; but this is a mere matter of preference, and it will be obvious that the two wheels may be of the same diameter, as they are separately adjustable. We prefer, however, to make them as represented, with the difference in their semi-diameter about equal to the intended average depth of furrow. For other kinds of tilling the size of the wheels and their adjustability may be varied at the discretion of the constructor.

The frame $k$ is also provided with a sustaining-wheel, $f$, (see Fig. 1,) which may be shifted from one end to the other at the end of each course, so as to be at the rear end during each course, or there may be one such wheel at each end all the time. This wheel may be so connected as to be adjustable.

The two ends of the frame $a$, which carry the two opposite gangs of plows or other tilling instruments, are at such an angle with each other, as represented, that when one gang is in action the other gang will be for the time elevated, so as to run clear of the surface of the ground; and at the end of each course the gang that was in action is elevated, and the one that was elevated is drawn down into action for the return-course; and this is done simply by reversing the pull on the ropes B and B' by the action of the engine. The rope B directly from the engine is fastened to the clevis $j$, and the other rope, B', from the engine passes around a pulley, or equivalent therefor, of the anchoring apparatus C, and thence goes to and is attached to a like clevis of the tilling apparatus on the other side of the axle of the wheels $c\,c$. These clevises are attached each to a rod, $g$, the opposite end of which is suitably secured to the frame $a$, so that when the engine is pulling on the rope B and letting out the rope B' the pull will be on the end $a'$ of the tilting frame $a$, which will have the effect to pull down that end of the frame to bring down its gang of plows or other implements into action and to elevate the other end; and at the end of this course when the action of the engine on the ropes is reversed the pull will be shifted to the rope B', which, acting through its clevis and rod $g$ connected with the opposite end of the frame $a$, will tilt the said frame, elevate the gang at the end $a'$, and draw down into action the gang at the end $a$ for the reverse course.

To prevent the continual pull on the ropes from tilting the frame $a$ too far, which would tend to make the rear end of each gang cut too deep, there are adjusting-nuts $h$ on the draw-rods $g$, which are stopped by gage-stops $i$ on the frame $k$, and as this frame has a gage-wheel, $f$, at the end the depth of tilling for the rear end of each gang is thus gaged. But we do not wish to confine ourselves to this mode of gaging, as other and equivalent modes may be substituted.

And although we have above described and represented the mode of application of our said invention which we have worked with success, we do not wish to be limited thereto, as other and equivalent modes of application may be substituted.

What we claim as our invention, and desire to secure by Letters Patent, is—

1. Mounting two gangs of plows or other tilling instruments in suitable frame-work and connecting them with a pair of sustaining and gaging wheels interposed between the two gangs, substantially as described, when this is combined with the pulling ropes or chains and suitable means of attachment thereto, substantially as described, so that by the operation of an engine on one side of a field and a suitable anchoring apparatus at the other side the said instruments can be drawn across the field alternately in opposite directions, as herein described.

2. Mounting the frame which carries the two opposite gangs of instruments on a central axis, so that it may be tilted thereon, substantially as described, in combination with the mode of connecting the ropes or chains with the said tilting frame, or the equivalent thereof, on opposite sides of the axis of vibration, as described, so that by reversing the pull on the ropes the frame shall be tilted to lift one gang out of action at the end of each course, and draw down into action the other gang for the return-course, as set forth.

JOHN FOWLER, JR.
DAVID GREIG.

Witnesses:
 ROBT. WM. EDDISON,
 ALEXR. THOMSON.